US007093592B2

(12) United States Patent
Cho

(10) Patent No.: US 7,093,592 B2
(45) Date of Patent: Aug. 22, 2006

(54) STEAM OVEN

(75) Inventor: Pung Yeun Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 10/758,044

(22) Filed: Jan. 16, 2004

(65) Prior Publication Data

US 2005/0066959 A1 Mar. 31, 2005

(30) Foreign Application Priority Data

Sep. 30, 2003 (KR) .................. 10-2003-0068046

(51) Int. Cl.
*F24D 1/00* (2006.01)
*A21B 1/08* (2006.01)
(52) U.S. Cl. .................. 126/369; 126/20; 239/553.5; 239/548
(58) Field of Classification Search ............ 126/369 O, 126/20 X, 5; 239/553.5 X, 548 X, 552, 239/553, 589; 219/682; 99/293
See application file for complete search history.

(56) References Cited

U.S. PATENT DOCUMENTS

| 4,906,485 A | * | 3/1990 | Kirchhoff ................... 426/506 |
| 5,014,679 A | | 5/1991 | Childs et al. |
| 5,515,773 A | * | 5/1996 | Bullard ........................ 99/330 |
| 5,517,980 A | * | 5/1996 | Cappello et al. .............. 126/20 |
| 5,968,574 A | * | 10/1999 | Sann .......................... 426/510 |
| 6,572,911 B1 | | 6/2003 | Corcoran et al. |

* cited by examiner

*Primary Examiner*—Alfred Basichas
(74) *Attorney, Agent, or Firm*—Staas & Halsey LLP

(57) ABSTRACT

A steam oven having a steam distributing unit which is installed in the steam oven and evenly distributes steam generated by a steam generator into a cooking cavity, which is defined in a cabinet of the steam oven. The steam oven has the steam generator, the cooking cavity, a steam feed pipe to feed the steam generated by the steam generator into the cooking cavity, and a steam distributing pipe to distribute the steam from the steam feed pipe into the cooking cavity. The steam oven additionally has a sectional area control part provided in the steam feed pipe, to control a flow speed of the steam in the steam feed pipe.

16 Claims, 4 Drawing Sheets

STEAM OVEN

CROSS-REFERENCE TO RELATED APPLICATIONS

This application claims the benefit of Korean Patent Application No. 2003-68046, filed Sep. 30, 2003 in the Korean Intellectual Property Office, the disclosure of which is incorporated herein by reference.

BACKGROUND OF THE INVENTION

1. Field of the Invention

The present invention relates, in general, to steam ovens and, more particularly, to a steam oven having a steam distributing unit that is installed in a cabinet of the steam oven to evenly distribute steam generated by a steam generator into all areas in a cooking cavity, which is defined in the cabinet.

2. Description of the Related Art

Generally, to cook foods, the foods may be: roasted with heat, such as in a gas oven; steamed by water vapor, such as in a steaming vessel; or boiled with water, such as in a cooking vessel. Also, there are methods to cook foods using microwaves, far infrared rays, and steam, etc.

When cooking using steam, steam is discharged from a steam generator into a cooking cavity to cook food in the cooking cavity. Accordingly, when cooking using steam, the food is not burnt, and controlling a temperature and a volume of the discharged steam easily controls a cooking temperature. Also, because oxidation of the food does not occur, cooking using steam has an advantage in that the cooked food has a better taste.

But in most conventional steam ovens, a steam distributing unit to distribute the steam into the cooking cavity is not provided on a steam feed unit that feeds the steam from the steam generator into the cooking cavity. Even in case of conventional steam ovens having a steam distributing unit on the steam feed unit, the steam distributing unit only allows the steam to be discharged into the cooking cavity in one direction, and in a manner of a straight flow.

Accordingly, when cooking large-sized food, the conventional steam ovens are problematic in that only a part of the food is effectively heated by the steam directly discharged onto the part of the food, but other parts of the food are not effectively heated because the steam is not discharged onto those parts of the food. When cooking small-sized food, the conventional steam ovens are problematic in that a heating ability of the steam oven varies according to a position at which the food is placed. Particularly, when cooking foods in the cooking cavity, in which a plurality of racks are installed, the heating ability of the steam oven varies according to positions of the foods, which are placed on the racks in the cooking cavity.

SUMMARY OF THE INVENTION

Accordingly, it is an aspect of the present invention to provide a steam oven to evenly cook food regardless of a size of the food or a position of the food within a cooking cavity by evenly distributing steam into the cooking cavity.

Additional aspects and/or advantages of the invention will be set forth in part in the description which follows and, in part, will be obvious from the description, or may be learned by practice of the invention.

The above and/or other aspects are achieved by providing a steam oven, having a steam generator, the cooking cavity, a steam feed pipe to feed steam generated by the steam generator into the cooking cavity, and a steam distributing pipe disposed at an end of the steam feed pipe to distribute the steam from the steam feed pipe into the cooking cavity.

According to one aspect, the steam distributing pipe has an irregular bent shape.

According to one aspect, the steam distributing pipe includes a plurality of steam distributing pipes, of which respective outlet ends are directed to different areas in the cooking cavity.

According to one aspect, the plurality of steam distributing pipes are arranged to direct the steam to spirally flow in the cooking cavity.

According to one aspect, the steam oven further includes a sectional area control part provided in the steam feed pipe, to control a flow speed of the steam in the steam feed pipe.

According to one aspect, the sectional area control part is controlled by a user, to adjust a sectional area of the steam feed pipe.

According to one aspect, the sectional area control part is adjacent to the steam distributing pipe.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
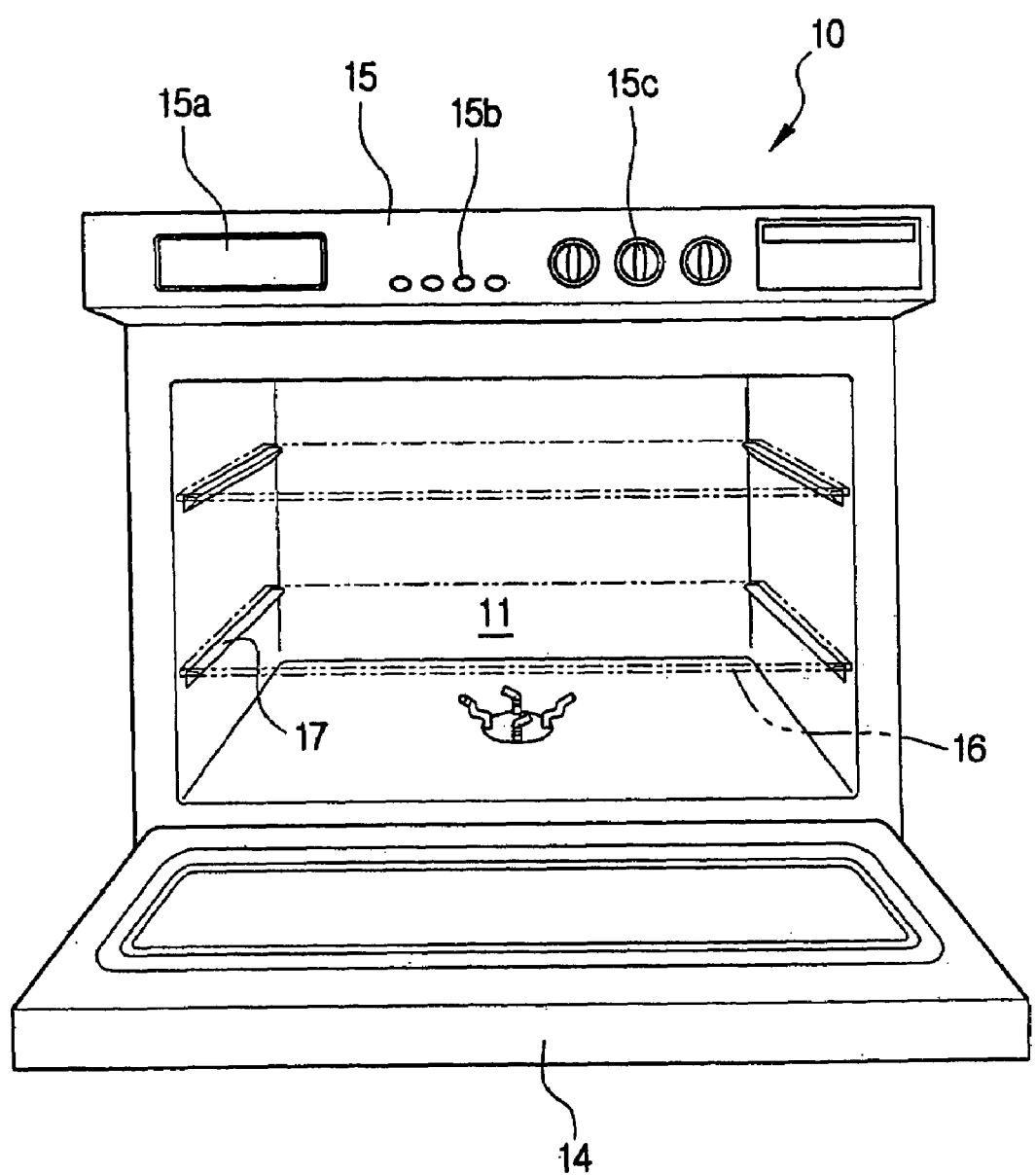
FIG. 1 is a front perspective view of a steam oven, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
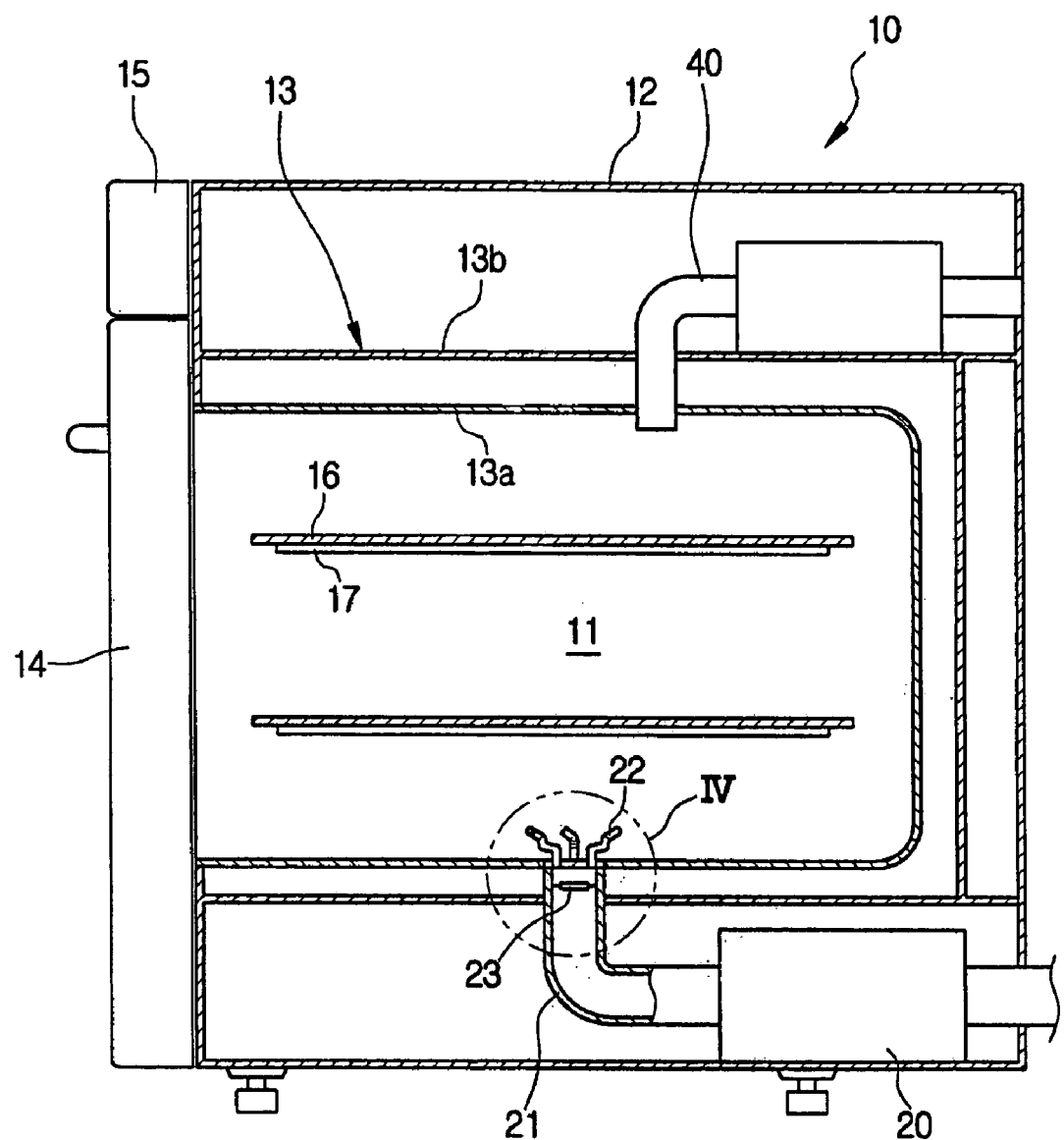
FIG. 2 is a side sectional view showing an internal construction of the steam oven of FIG. 1.

FIG. 1 is a front perspective view of a steam oven, according to an embodiment of the present invention. FIG. 2 is a side sectional view showing an internal construction of the steam oven of FIG. 1.

As is shown in FIGS. 1 and 2, the steam oven according to the embodiment of the present invention includes a cabinet 10 to define a cooking cavity 11 therein, and a steam generator 20, which is installed in the cabinet 10. The steam generator 20 is mounted to an inner surface of a lower wall of the cabinet 10, and supplies steam into the cooking cavity 11.

The cabinet 10 includes an outer casing 12 made of a steel plate, and an inner casing 13, which is installed in the outer casing 12, is spaced apart from the outer casing 12, and defines the cooking cavity 11 therein. The cooking cavity 11 is open at a front thereof to insert into and remove foods from the cooking cavity 11. Also, the inner casing 13 includes a first casing 13a and a second casing 13b, which are spaced apart from each other to insulate the cooking cavity 11 from an outside of the cooking cavity 11. That is, each wall of the cooking cavity 11 includes a multi-layered panel that has a plurality of sheets spaced apart from each other.

A door 14, which rotates downward to open and rotates upward to close, is attached to the open front of the cabinet 10 to allow a user to open and close the cooking cavity 11. A control unit 15, which includes a display 15a to display an operational state of the steam oven thereon, a plurality of control buttons 15b, and a plurality of control switches 15c, is provided at a predetermined portion of the cabinet 10 above the door 14.

Upper and lower racks 16 are provided at upper and lower positions in the cooking cavity 11 to respectively support foods thereon. Each of the upper and lower racks 16 is removably installed in the cooking cavity 11 to slide in a drawer-type movement along a plurality of guide rails 17 which are oppositely provided on inner surfaces of sidewalls of the inner casing 13.

The steam generator 20, which is mounted to the inner surface of the lower wall of the cabinet 10, generates steam by boiling water supplied therein from an outside of the cabinet 10. The steam generated by the steam generator 20 is supplied into the cooking cavity 11 through a steam feed pipe 21 having a steam distributing unit. An exhaust duct 40 is provided at an upper portion in the cooking cavity 11 to discharge the steam from the cooking cavity 11 to the outside of the cooking cavity 11, after the steam is used in the cooking cavity 11 to heat the food.

Figure 3:
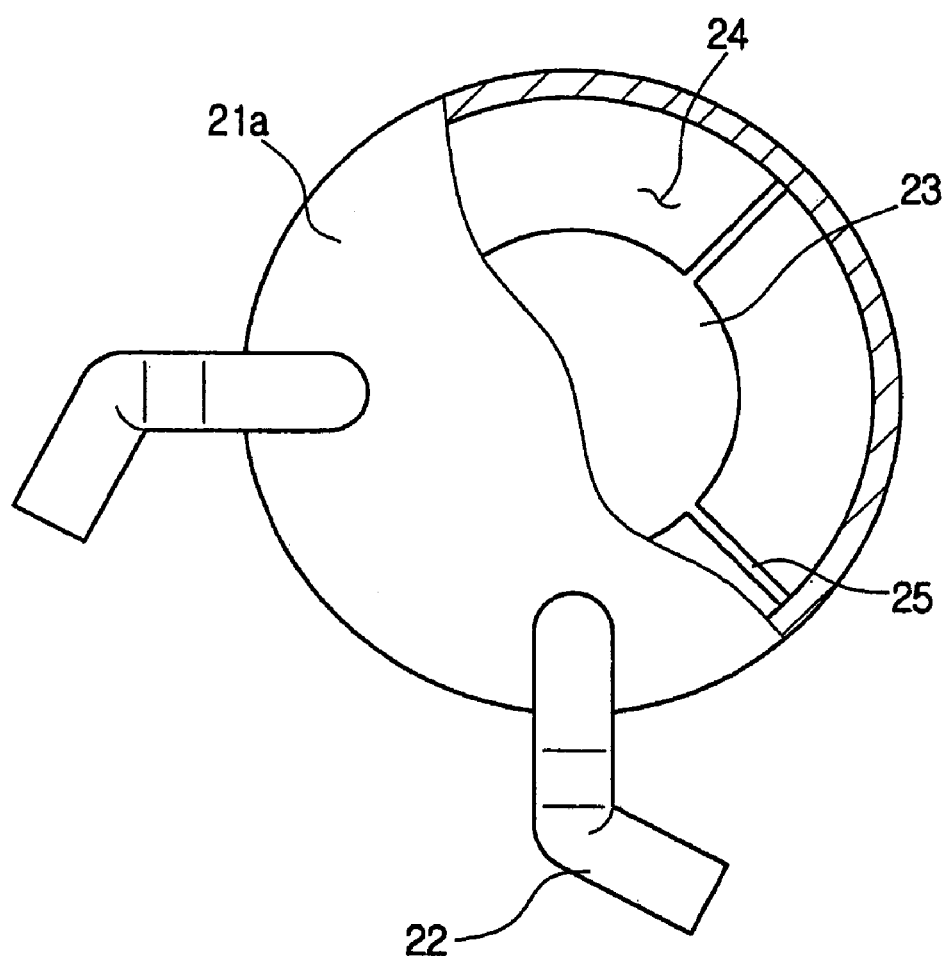
FIG. 3 is a partially broken sectional view showing an internal construction of a steam feed pipe of the steam oven of FIG. 1.
Figure 4:
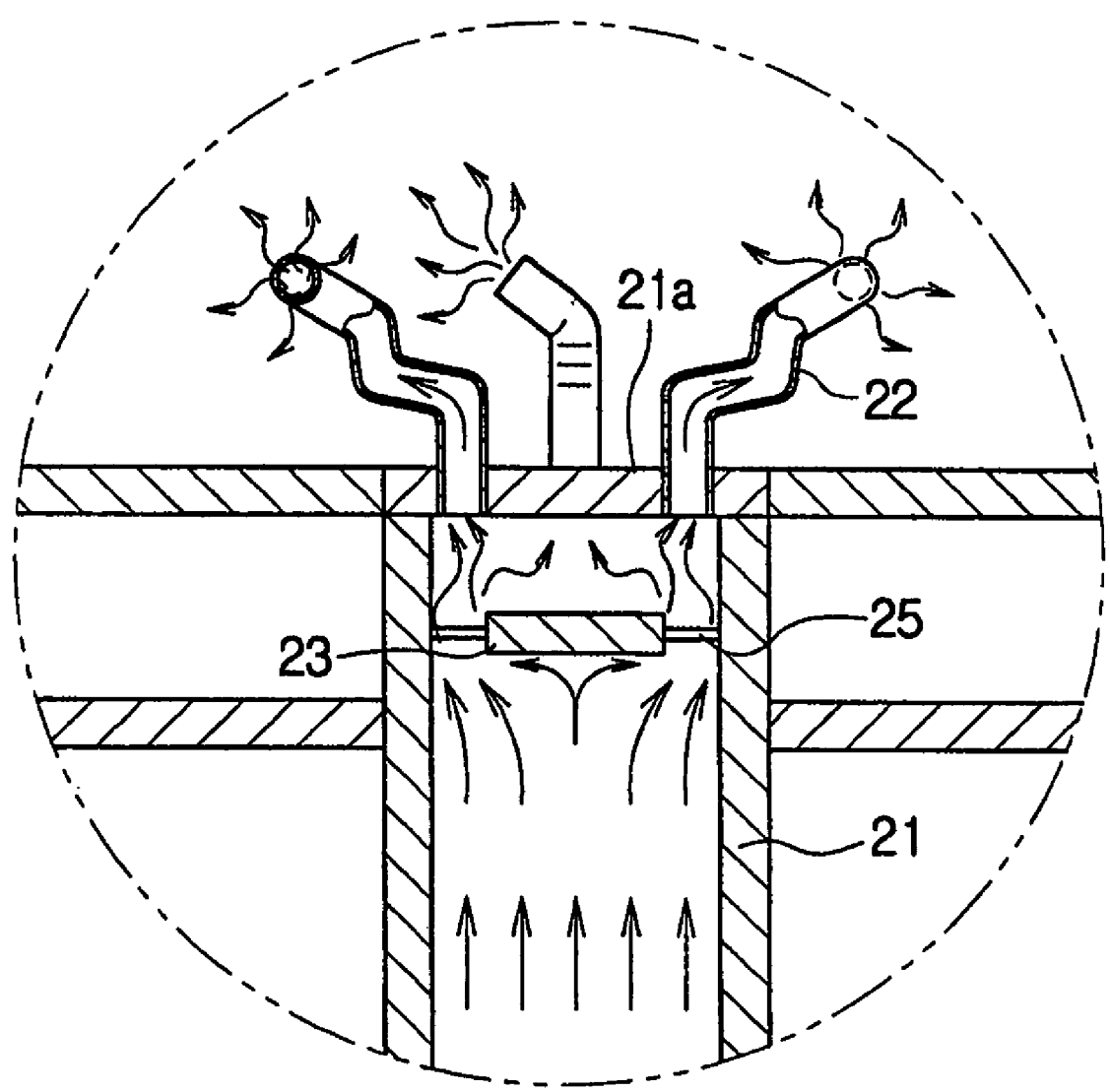
FIG. 4 is a sectional view of an encircled portion IV of FIG. 2.

FIG. 3 is a partially broken sectional view showing an internal construction of the steam feed pipe 21 of the steam oven of FIG. 1, and FIG. 4 is a sectional view of an encircled portion IV of FIG. 2, in which currents of steam flowing in and distributed from the steam feed pipe 21 of the steam oven of FIG. 1 are shown. As is shown in FIGS. 3 and 4, in the steam oven of the present invention, the steam distributing unit comprises a plurality of steam distributing pipes 22, a sectional area control plate 23, and a plurality of support ribs 25, to support the sectional area control plate 23 in an upper portion of the steam feed pipe 21 at a predetermined position.

The sectional area control plate 23 and the plurality of support ribs 25 define a sectional area control part 24 in the upper portion of the steam feed pipe 21 to control a flow speed of the steam, which is fed from the steam generator 20 into the cooking cavity 11 through the steam feed pipe 21. According to one aspect, the sectional area control part 24 comprises a plurality of sectional area control spaces, which are defined between the sectional area control plate 23, the plurality of support ribs 25, and an inner surface of the steam feed pipe 21.

When the steam passes through the sectional area control part 24 in the steam feed pipe 21, a pressure and the flow speed of the steam are respectively reduced and increased, since the sectional area of the steam feed pipe 21 is abruptly reduced at the sectional area control part 24. The above-mentioned change in the pressure and the flow speed of the steam is explained by Bernoulli's theorem. Accordingly, kinetic energy of the steam rapidly increases in response to the increase in the flow speed of the steam.

According to one aspect, the sectional area control part 24 is created by closing a center of the upper portion of the steam feed pipe 21 and opening an area around the center of the upper portion of the steam feed pipe 21, as is shown in FIG. 3. But according to another aspect, the sectional area control part 24 is created by creating a closing part around the inner surface of the upper portion of the steam feed pipe 21, to open the center of the upper portion of the steam feed pipe 21. According to yet another aspect, the sectional area control part 24 comprises an iris diaphragm-type mechanism, a valve mechanism, etc., so that the mechanism controls the sectional area of the steam feed pipe 21 in response to a manipulation of a user.

The steam distributing pipes 22 are mounted to the steam feed pipe 21 at positions above the sectional area control part 24. According to one aspect, the steam distributing pipes 22 are mounted near the sectional area control part 24 to allow the steam to quickly pass through the steam distributing pipes 22 before the kinetic energy of the steam, which increases when passing through the sectional area control part 24, reduces.

The steam distributing pipes 22 allow the steam to be evenly distributed from the steam feed pipe 21 into all areas in the cooking cavity 11. The steam distributing pipes 22 are mounted to an end wall 21a, which is provided at an upper end of the steam feed pipe 21 to close the upper end of the steam feed pipe 21. According to one aspect, the steam distributing pipes 22 are pressed stainless steel. A size, a shape, a position, a steam discharging direction, and a number of the steam distributing pipes 22 are appropriately designed according to a size and a shape of the cooking cavity 11. According to one aspect, the steam distributing pipes 22 comprise four pipes, which are respectively arranged on the end wall 21a, and are uniformly spaced apart from each other at an angular interval. Outer ends of the four steam distributing pipes 22 are directed to different areas in the cooking cavity 11 to evenly distribute the steam to all parts in the cooking cavity 11, thus evenly heating the cooking cavity 11.

When the four steam distributing pipes 22 are respectively constructed to have regular bent shapes, as shown in FIG. 3, the steam which is discharged from the steam distributing pipes 22 into the cooking cavity 11 spirally flows within the cooking cavity 11 counterclockwise. Furthermore, when the four steam distributing pipes 22 are respectively constructed to have irregular bent shapes, the kinetic energy of the steam further increases while the steam passes through the steam distributing pipes 22.

In addition, because the flow of the steam, which passes through the steam distributing pipes 22 having the irregular bent shapes, becomes a turbulent flow even though the steam passes through the steam feed pipe 21 in a state of laminar flow, the steam is evenly distributed into the cooking cavity 11. Because the flow speed of the steam increases twice, because of the sectional area control part 24 and the steam distributing pipes 22, the steam oven more effectively generates the turbulent flow of steam, so that the steam oven more effectively feeds the steam from the steam generator 20 into the cooking cavity 11 without an additional blowing unit.

As is apparent from the above description, in the steam oven, steam is evenly distributed into all areas in the cooking cavity 11 by a plurality of steam distributing pipes 22, and food is evenly heated regardless of the size or position of the food within the cooking cavity 11.

Furthermore, in the steam oven, the flow of the steam is changed, by both the sectional area control part 24 and the steam distributing pipes 22, from laminar to turbulent, and the steam is evenly distributed into all areas in the cooking cavity 11.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A steam oven, comprising:
   a steam generator;
   a cooking cavity;
   a steam feed pipe to feed steam generated by the steam generator into the cooking cavity;
   a steam distributing pipe disposed at an end of the steam feed pipe to distribute the steam from the steam feed pipe into the cooking cavity;
   the steam distributing pipe comprises a plurality of steam distributing pipes, of which outlet ends are directed to different areas in the cooking cavity, respectively; and
   the plurality of steam distributing pipes are arranged to direct the steam to spirally flow in the cooking cavity.

2. The steam oven according to claim 1, wherein:
   the steam distributing pipe has an irregularly bent shape.

3. The steam oven according to claim 1, wherein:
   the sectional area control part is controlled by a user, to adjust a sectional area of the steam feed pipe.

4. The steam oven according to claim 1, wherein the sectional area control part is adjacent to the steam distributing pipe.

5. An apparatus, comprising:
   a cooking cavity;
   a steam generator generating steam;
   a sectional area control part, directing the steam from the steam generator into the cooking cavity, and controlling a flow speed of the steam;
   a steam feed pipe directing the steam from the steam generator into the cooking cavity, wherein the sectional area control part is positioned in the steam feed pipe; and
   at least one support rib connected to the sectional area control part and an inner surface of the steam feed pipe,
   wherein the sectional area control part is defined as an area between the sectional area control part, the at least one support rib, and the inner surface of the steam feed pipe.

6. The apparatus according to claim 5, wherein:
   the sectional area control part controls the flow speed of the steam in accordance with a manipulation by a user.

7. The apparatus according to claim 5, further comprising:
   at least one steam distributing pipe directing the steam from the sectional area control part into the cooking cavity and further increasing the flow speed of the steam.

8. The apparatus according to claim 7, further comprising:
   a steam feed pipe; and
   an end wall positioned at an end of the steam feed pipe opposite to the steam generator and connected to a first end of the at least one steam distributing pipe,
   wherein
      the steam feed pipe and the end wall direct the steam from the steam generator to the at least one steam distributing pipe, and
      the sectional area control part is positioned in the steam feed pipe adjacent to the end wall.

9. The apparatus according to claim 7, wherein:
   the at least one steam distributing pipe evenly distributes the steam into the cooking cavity.

10. The apparatus according to claim 7, wherein:
    the at least one steam distributing pipe is pressed stainless steel.

11. The apparatus according to claim 7, wherein:
    the at least one steam distributing pipe is a plurality of steam distributing pipes.

12. The apparatus according to claim 11, wherein:
    respective first ends of the plurality of steam distributing pipes are directed to different areas of the cooking cavity, to evenly distribute the steam into the cooking cavity.

13. The apparatus according to claim 7, wherein:
    the at least one steam distributing pipe has at least one bend, to further control the flow speed of the steam.

14. The apparatus according to claim 13, wherein:
    the at least one bend induces turbulence in the steam.

15. The apparatus according to claim 13, wherein:
    the sectional area control part and the at least one bend induce turbulence in the steam; and
    the apparatus does not comprise a blowing unit.

16. An apparatus, comprising:
    a cooking cavity;
    a steam generator generating steam;
    a sectional area control part, directing the steam from the steam generator into the cooking cavity, and controlling a flow speed of the steam;
    at least one steam distributing pipe directing the steam from the sectional area control part into the cooking cavity and further controlling the flow speed of the steam; and
    the at least one steam distributing pipe directs the steam spirally into the cooking cavity.

* * * * *